United States Patent [19]

Chemelewski

[11] Patent Number: 4,953,670
[45] Date of Patent: Sep. 4, 1990

[54] VEHICLE WHEEL SPEED SENSOR

[75] Inventor: Tad M. Chemelewski, Fort Wayne, Ind.

[73] Assignee: Dana Corporation, Toledo, Ohio

[21] Appl. No.: 278,039

[22] Filed: Nov. 30, 1988

[51] Int. Cl.$^5$ .............................................. B60T 8/02
[52] U.S. Cl. ............................ 188/181 A; 188/181 R; 310/168; 475/150
[58] Field of Search ............... 188/180, 181 R, 181 A, 188/181 C, 181 T, 182; 310/168, 155, 169, 170, 154; 403/356, 337, 340; 74/711; 324/174; 303/1

[56] References Cited

U.S. PATENT DOCUMENTS

| | | | |
|---|---|---|---|
| 1,171,380 | 2/1916 | Arthur | 403/339 |
| 2,937,042 | 5/1960 | Wilder, Jr. | 403/356 |
| 3,138,970 | 6/1964 | Costa et al. | 74/711 |
| 3,504,538 | 4/1970 | Andrews et al. | 310/168 |
| 3,719,841 | 3/1973 | Ritsema | 310/155 |
| 3,769,533 | 10/1973 | Pauwels | 310/155 |
| 3,772,547 | 11/1973 | Abate | 310/168 |
| 4,090,592 | 5/1978 | Jovick et al. | 188/181 R |
| 4,462,272 | 7/1984 | Roper | 74/711 |
| 4,527,986 | 7/1985 | Bridgewater et al. | 403/339 X |

Primary Examiner—Douglas C. Butler
Assistant Examiner—Matthew C. Graham
Attorney, Agent, or Firm—Marshall & Melhorn

[57] ABSTRACT

An apparatus for sensing the angular velocity of a vehicle wheel includes a sleeve, a tone wheel detachably coupled to the sleeve, and an electromagnetic sensor. The sleeve can be rotatably mounted on bushings inside a differential housing. The electromagnetic sensor extends through a wall of the housing into close proximity to a periphery of the tone wheel which has a plurality of generally radially extending evenly spaced teeth formed thereon. The tone wheel is positioned on the sleeve between a pair of retaining rings and is keyed for rotational movement with the sleeve. An inner end of the sleeve has means for coupling to the side gear of a differential carrier assembly. In one embodiment, the means for coupling includes tabs formed on the sleeve and cooperating slots formed on a side gear. In another embodiment, lugs formed on the sleeve engage driving surfaces formed on the side gear.

15 Claims, 3 Drawing Sheets

VEHICLE WHEEL SPEED SENSOR

BACKGROUND OF THE INVENTION

The invention relates in general to an apparatus for sensing vehicle wheel angular speed and, in particular, to such an apparatus for use in an antilock brake control system.

Vehicle antilock braking systems respond to signals representing the angular velocity of one or more wheels of the vehicle. Typically, a wheel speed sensor includes at least one magnet mounted on a stationary portion of the vehicle and a toothed or slotted metal rotor which rotates in response to the wheel movement and which is located adjacent the sensing device. As the rotor teeth or slots pass the sensing device, variations in the magnetic flux produce a voltage the frequency of which is a function of the angular velocity of the wheel and the number of teeth or slots in the rotor.

In order to generate a voltage level which provides an accurate indication of the speed, the sensing device and the rotor must be accurately positioned with respect to one another during initial assembly and they must remain in this relationship even after extended periods of operation in which the components are subjected to road shocks and repeated vibrations. Therefore, most wheel speed sensors are mounted in the area of the wheel. However, such a location requires that additional care be taken not to damage the sensor during wheel maintenance.

As an alternative, the rotor can be directly mounted on the axle shaft and the sensing device mounted on the differential housing of a drive axle. However, such a mounting location also creates other problems. During initial installation of the axle, the axle shaft must be inserted into the differential through the interior of the drive axle housing. Thus, great potential exists for damaging the sensor either during installation or removal for maintenance. Furthermore, since the end of the drive axle housing adjacent the wheel has an inside diameter only slightly larger than the outside diameter of the axle shaft, the size of the rotor is limited if it is to be mounted on the drive axle before assembly to the differential.

Another problem exists where better braking control and shorter stopping distances are desired. Such system performance demands a higher number of teeth on the rotor for better resolution. Thus, the distance between the sensing device and the rotor must be minimized and maintained within predetermined limits throughout the rotor rotation. The normal manufacturing tolerances for an axle shaft and the side gears of the differential tend to militate against the maintenance of the proper spacing or "air gap".

SUMMARY OF THE INVENTION

In view of the above-identified problems, it is an object of the present invention to provide a wheel speed sensor for a drive axle which can be located inwardly of the wheel in a differential housing. Such a sensor can be installed when the differential is assembled and prior to or after insertion of the drive axles.

The present invention includes a sleeve which is detachably coupled at its inner end to the side gear of the differential for rotation therewith. A coupling means can include any suitable device such as tabs on the sleeve and cooperating slots on the side gear, or lugs on the sleeve and cooperating driving surfaces on the side gear. The outer end of the sleeve is detachably coupled to a toothed rotor disk or tone wheel. The sleeve rotates on its own set of bearings in the differential housing and an electromagnetic sensor extends through the differential housing wall into proximity with the periphery of the tone wheel.

A drive axle shaft is inserted through the center of the sleeve to couple its inner end with the side gear. Thus, the sleeve protects both the tone wheel and the electromagnetic sensor during assembly and disassembly of the drive axle shaft. The inner end of the sleeve has formed thereon a radially outwardly extending flange which is trapped between a thrust surface on the differential housing and the side gear to prevent excessive axial movement of the tone wheel with respect to the electromagnetic sensor.

The tone wheel is keyed to the sleeve to prevent relative rotation and is axially retained between a pair of retaining rings engaging a pair of spaced grooves in the exterior surface of the sleeve. Since the sleeve rotates in bearings in the differential housing, the associated tone wheel is also isolated from radial movements of the drive axle shaft during rotation.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
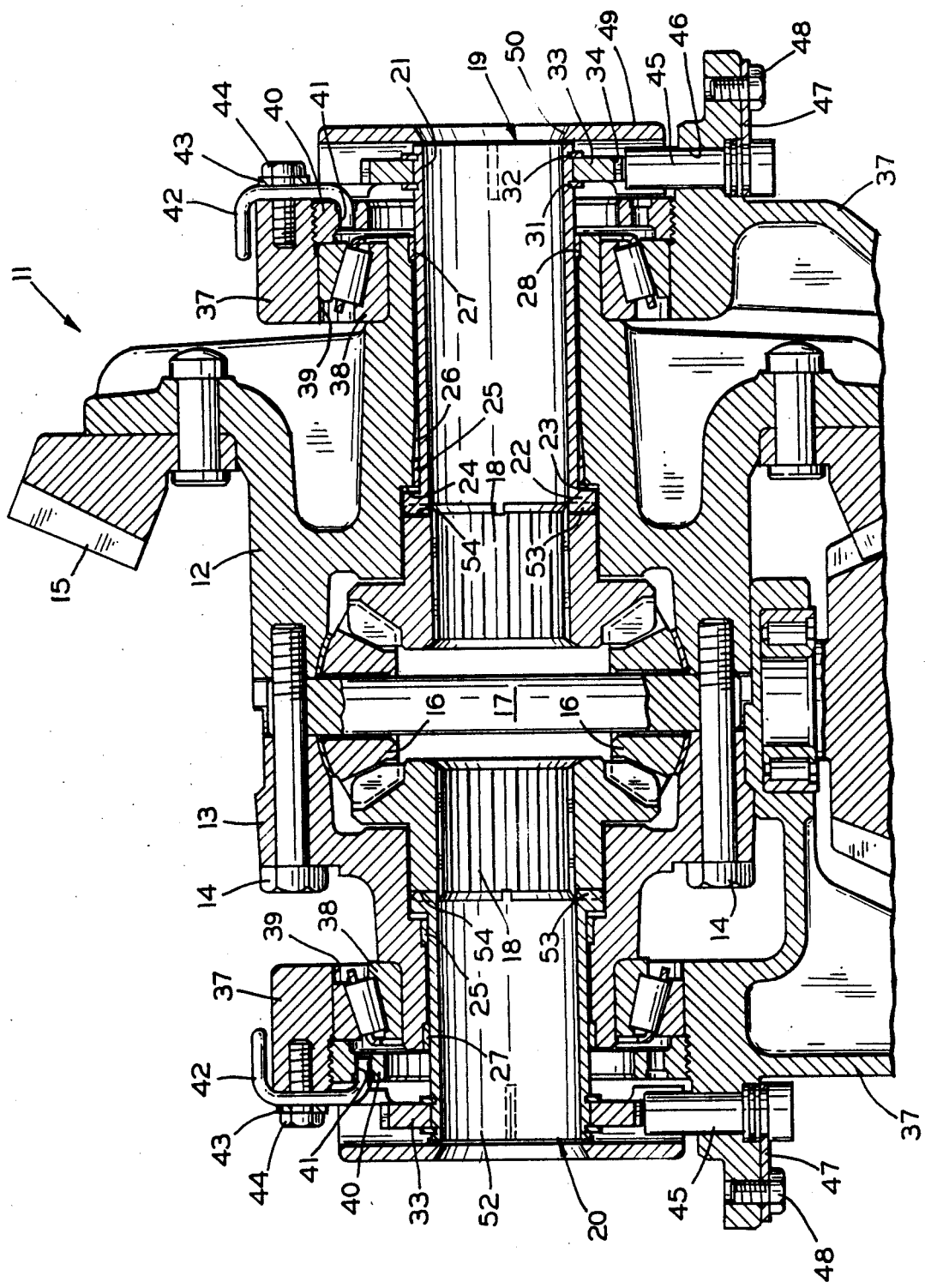
FIG. 1 is a fragmentary sectional view of a differential carrier assembly incorporating two wheel speed sensors according to the present invention.

There is shown in FIG. 1 a fragmentary sectional view of a differential carrier assembly 11 including a differential case formed of a flange half 12 and a cap half 13. A plurality of threaded fasteners such as bolts 14 extend through apertures formed in the case half 13 and threadably engage threaded apertures formed in the case half 12. A ring gear 15 is attached to the flange case half 12 for rotation by a pinion gear (not shown) driven by a drive shaft (not shown) of the vehicle. A pair of differential pinion gears 16 are journalled on a differential spider 17 and are located inside the case halves 12 and 13. The differential pinion gears 16 engage a pair of side gears 18 which are internally splined for coupling to the inner ends of a pair of drive axle shafts 9 and 10.

Since the vehicle wheels are driven by the drive axle shafts which in turn are driven by the side gears 18, the rotation of the side gears can be sensed in order to generate a signal representing the angular speed of the vehicle wheels. A pair of speed sensors according to the present invention are mounted in the carrier assembly 11, one in each of the differential case halves 12 and 13. In the carrier assembly 11, the distance between the center of the differential spider 17 and an outer end of the flange case half 12 is greater than the distance between the center of the differential spider 17 and an outer end of the cap case half 13. Thus, a longer speed sensor 19 is utilized with the case half 12 and a shorter speed sensor 20 is utilized with the case half 13.

Figure 2:
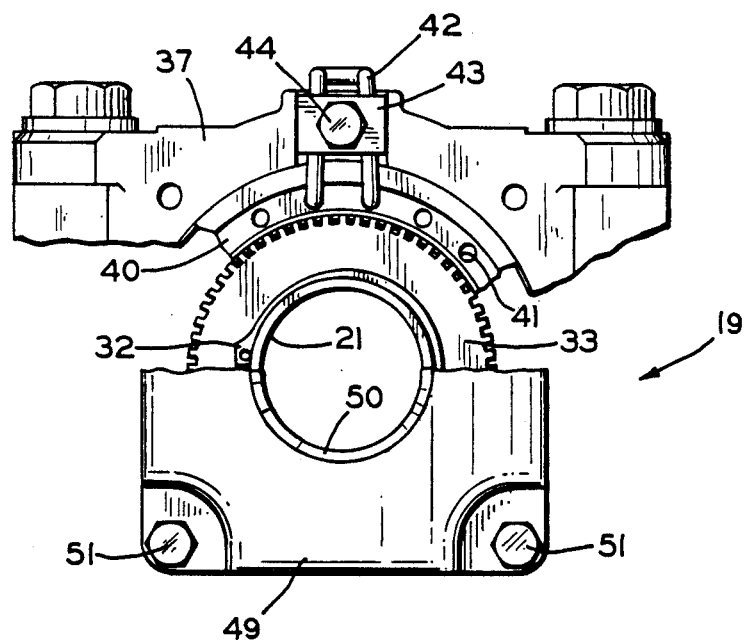
FIG. 2 is a fragmentary side elevational view of one of the speed sensors shown in FIG. 1.
Figure 3:
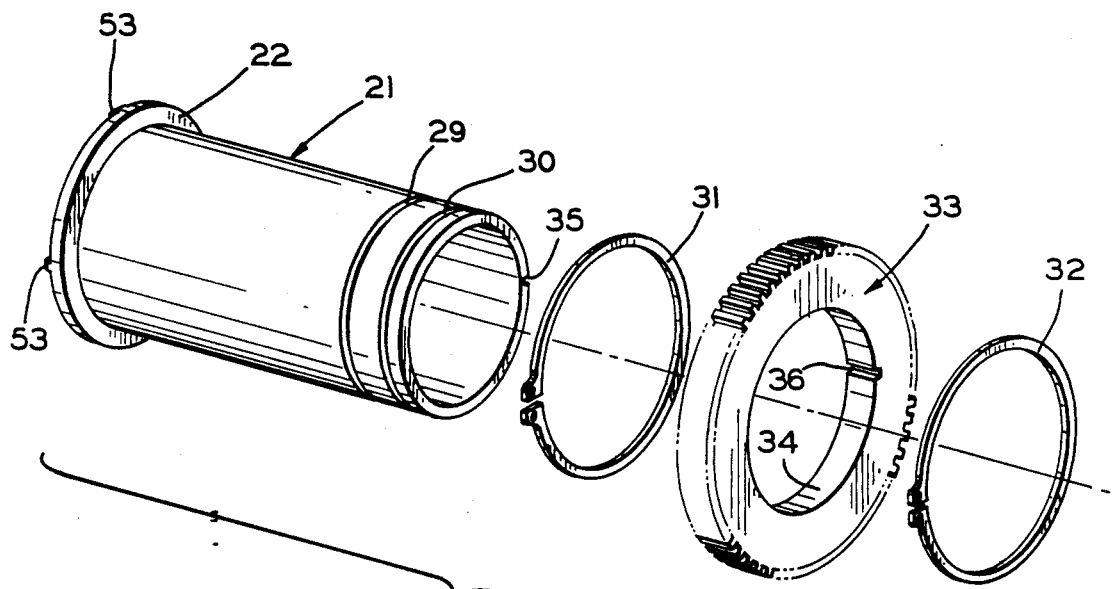
FIG. 3 is an exploded perspective view of the sleeve and the tone wheel of the speed sensor shown in FIG. 2.

Referring to FIGS. 1 through 3, the longer speed sensor 19 includes a sleeve 21 which can be rotatably mounted in the case half 12. A generally radially extending flange 22 is formed at an inner end of the sleeve 21. A surface of the flange 22 facing toward the outer end of the sleeve 21 abuts a thrust washer 23 which in turn abuts a generally radially extending annular thrust surface 24 formed on the interior of the differential case flange half 12. The sleeve 21 is rotatably mounted in bushings such as a first bushing 25 which extends about the exterior surface of the sleeve 21 and abuts the thrust washer 23. The bushing 25 can be formed as a split ring the outer peripheral surface of which abuts an axially extending annular bearing surface 26 formed on the interior wall of the case half 12 adjacent the annular thrust surface 24. A similar second bushing 27 extends about the outer surface of the sleeve 21 at the outer end of the opening in the case half 12 for the drive shaft axle. The bushing 27 is retained in an axially extending annular relief 28 formed in the interior of the case half 12.

As best seen in FIG. 3, the outer end of the sleeve 21 has a pair of spaced apart annular grooves 29 and 30 formed in the exterior surface thereof. A retaining ring or snap ring 31 is retained by the groove 29 and a second retaining ring or snap ring 32 is retained by the groove 30. The grooves 29 and 30 are spaced apart a distance corresponding to the thickness of a disk or tone wheel 33. The tone wheel 33 has a central aperture 34 formed therein of a diameter corresponding to the outer diameter of the sleeve 21. Thus, the tone wheel 33 accepts the sleeve 21 in the aperture 34 and is prevented from axial movement along the sleeve 21 by the retaining rings 31 and 32. An axially extending key slot 35 is formed in the exterior of the sleeve 21 and a similar key slot 36 is formed in the wall of the aperture 34. The key slots 35 and 36 are aligned and a key (not shown) is inserted therein to prevent relative rotational movement between the sleeve 21 and the tone wheel 33.

The differential carrier assembly 11 is rotatably mounted in a differential housing 37, a portion of which is shown in FIG. 1. For example, the case half 12 has a roller bearing 38 mounted on a reduced outside diameter end portion thereof. The bearing 38 is also mounted in an aperture 39 formed in the differential housing 37. The bearing 38 is prevented from axial movement with respect to the case half 12 and the differential housing 37 by a locking nut or ring 40 which is externally threaded for engaging a set of internal threads formed in the aperture 39. The locking ring 40 has a plurality of generally evenly spaced axially extending apertures 41 formed therein. A generally U-shaped wire 42 is positioned with its free ends inserted into two adjacent ones of the apertures 41. The wire 42 is trapped between the differential housing 37 and a lock washer 43 which is attached to the differential housing 37 by a suitable fastener such as a bolt 44.

An electromagnetic sensor 45 extends through an aperture 46 formed in the wall of the differential housing 37 and into close proximity with the periphery of the tone wheel 33. The sensor 45 can be held in position in the aperture 46 by a mounting plate 47 which is attached to the differential housing 37 by a suitable fastener such as a bolt 48. The sleeve 21, the tone wheel 33 and the sensor 45 are protected from damage by a guard plate 49 having a central aperture 50 formed therein. The aperture 50 provides clearance for inserting the drive axle shaft and is attached to the differential housing 37 by any suitable fastener such as bolts 51.

The shorter speed sensor 20 is mounted in the case half 13 in a similar manner. The only differences between the speed sensor 19 and the speed sensor 20 is that the speed sensor 20 incorporates a shorter sleeve 52 upon which the tone wheel 33 is mounted.

Both the sleeve 21 and the sleeve 52 are detachably coupled to the associated ones of the side gears 18 by a slot and a tab system. The sleeve 21 has four axially extending tabs 53 formed on the flange 22. The tabs 53 are substantially evenly spaced around the flange 22 and extend in a direction toward the facing surface of the side gear 18. As shown in FIG. 1, the side gear 18 has corresponding slots 54 formed therein for retaining the tabs 53 when the sleeve 21 abuts the side gear 18. Thus, as the side gear 18 is rotated to drive a drive axle shaft, the sleeve 21 will also be rotated as will the attached tone wheel 33. The passage of the teeth 34 past the adjacent end of the sensor 45 will generate a voltage having a frequency proportional to the speed of rotation of the drive axle shaft and its associated wheel.

Figure 4:
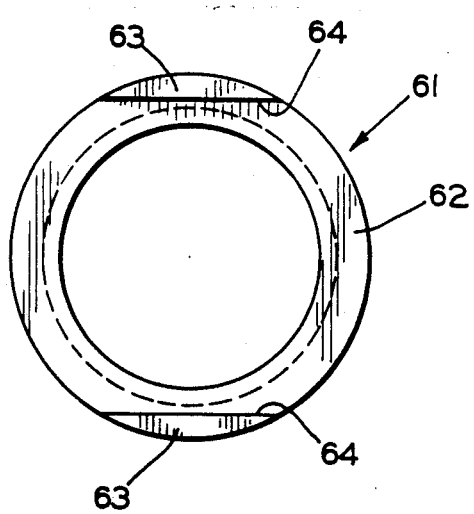
FIG. 4 is a side elevational view of an inner end of a sleeve according to an alternate embodiment of the present invention.
Figure 5:
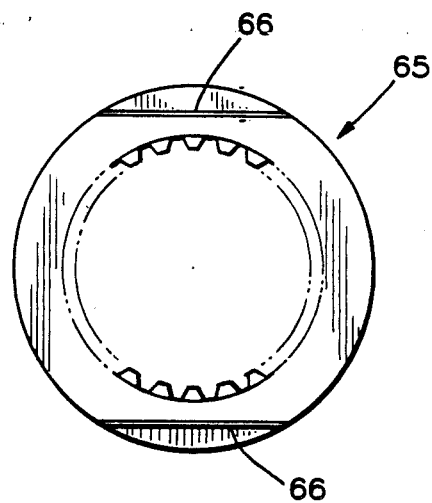
FIG. 5 is a side elevational view of a side gear for use with the sleeve shown in FIG. 4.
Figure 6:
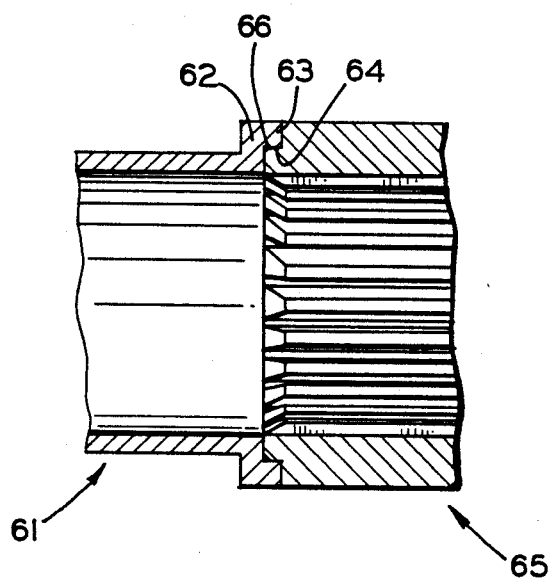
FIG. 6 is a fragmentary sectional view of the sleeve shown in FIG. 4 and the side gear shown in FIG. 5 coupled together.

There is shown in FIGS. 4 through 6 an alternate embodiment of the sleeves 19 and 21. A sleeve 61 has a flange 62 formed at one end thereof which flange 62 is similar to the flange 22. A pair of driven lugs 63 are formed diametrically opposed at the periphery of the flange 62. The lugs 63 extend axially outwardly from the end surface of the flange 62 and each has a facing substantially planar driven surface 64. A side gear 65 which is similar to the side gear 18 is shown in FIG. 5. However, a portion of the end surface of the side gear 65 has been cut away to provide a pair of substantially planar and parallel driving surfaces 66. When the side gear 65 abuts the flange 62 of the sleeve 61, the driving surfaces 66 engage the driven surfaces 64 to detachably couple the side gear 65 to the sleeve 61 as shown in FIG. 6. Thus, the sleeve 61 is driven in rotation by the side gear 65 in the same manner that the side gears 18 drive the sleeves 21 and 52.

The vehicle wheel speed sensors of the present invention provide many advantages that were lacking in the prior art speed sensors. The mounting location in the differential housing protects the sensors from damage during maintenance of the wheels. The sleeve and the guard plate protect the tone wheel and the electromagnetic sensor against damage during assembly and disassembly of the differential axle shafts. There are no modifications required to be made to the existing axles or housings thereby allowing the present invention to be added to existing vehicles. Only minor changes need to be made to the side gear, the differential case and the differential housing to accommodate the sleeve, the bearings and the electromagnetic sensor. The guard plate also permits easy access to the various elements of the sensor for maintenance.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for sensing the angular speed of a wheel mounted on the end of a drive axle of a vehicle, the drive axle including a housing enclosing an axle shaft and a differential carrier assembly with a side gear for rotating the axle shaft and an associated wheel, comprising:

a tone wheel having a plurality of generally evenly spaced radially extending teeth formed thereon and means for detachably coupling said tone wheel for rotation with an axle shaft;

a sleeve adapted to be rotatably mounted inside a housing for enclosing an axle shaft, said sleeve having means formed at an outer end thereof for engaging said means for detachably coupling said tone wheel and means formed at an inner end thereof for detachably coupling to a side gear of a differential carrier assembly for rotation of said sleeve;

a generally radially outwardly extending flange formed on said inner end of said sleeve and being adapted to cooperate with a differential case mounted in the housing to restrict axial movement of said sleeve with respect to the housing; and a sensor adapted to be mounted through a wall of the housing adjacent a periphery of said tone wheel for detecting the passage of said teeth as the side gear rotates said sleeve and said tone wheel whereby a predetermined air gap is maintained between said sensor and said tone wheel.

2. The apparatus according to claim 1 wherein said tone wheel has a central aperture formed therein for receiving said sleeve.

3. The apparatus according to claim 2 wherein said sleeve has a pair of spaced apart grooves formed in an exterior surface thereof adjacent an outer end thereof, and including a pair of retaining rings for engaging respective ones of said grooves and positioning said tone wheel between said retaining rings to prevent relative axial movement between said tone wheel and said sleeve.

4. The apparatus according to claim 3 wherein said means for coupling said tone wheel includes an axially extending key slot formed in a surface of said aperture, said means for engaging includes another axially extending key slot formed in an exterior surface of said sleeve, said key slots adapted to cooperate with a key for preventing relative rotation between said tone wheel and said sleeve.

5. The apparatus according to claim 1 wherein said means for coupling to a side gear includes a plurality of generally axially extending tabs formed on said inner end of said sleeve and adapted to engage a cooperating plurality of slots formed in a facing surface of the side gear of the differential carrier assembly.

6. The apparatus according to claim 1 wherein said means for coupling to a side gear includes at least a pair of diametrically opposed lugs formed on said inner end of said sleeve and adapted to engage corresponding driving surfaces formed on a facing surface of the side gear of the differential carrier assembly.

7. The apparatus according to claim 1 including a guard plate having an aperture formed therein for receiving a drive axle shaft and adapted to be attached to the housing for protecting said tone wheel and said sensor from damage during assembly and disassembly of a drive axle shaft.

8. A speed sensing system for a pair of wheels mounted on opposite ends of a drive axle of a vehicle, comprising:

a housing adapted for enclosing a pair of axle shafts and a differential with a pair of side gears for rotating axle shafts and associated wheels;

a pair of tone wheels each having a plurality of generally evenly spaced radially extending teeth formed thereon and means for detachably coupling each said tone wheel for rotation with an associated axle shaft;

a pair of sleeves rotatably mounted inside said housing, each said sleeve having means at an outer end for engaging said means for coupling one of said tone wheels and means formed at an inner end thereof for detachably coupling to an associated one of said side gears;

a generally radially outwardly extending flange formed on said inner end of each of said sleeves and being adapted to cooperate with a differential case mounted in the housing to restrict axial movement of said sleeves with respect to the housing; and a pair of sensors mounted through a wall of said housing for detecting the passage of said teeth when said side gears rotate said sleeves and said tone wheels whereby a predetermined air gap is maintained between each said sensor and a periphery of an associated one of said tone wheels.

9. The system according to claim 8 including a pair of bushings extending about an exterior surface of each of said sleeves and cooperating with corresponding bearing surfaces formed on an interior surface of said housing for rotatably mounting said sleeves in said housing.

10. The system according to claim 8 including a pair of guard plates, each of said guard plates having an aperture formed therein adapted for receiving a drive axle shaft and mounted on said housing for protecting associated ones of said tone wheels and said sensors.

11. The system according to claim 8 wherein one of said sleeves is axially longer than the other one of said sleeves.

12. A speed sensing apparatus for a wheel mounted on the end of a drive axle of a vehicle, the drive axle including a housing enclosing an axle shaft and a differential with a side gear for rotating the axle shaft and an associated wheel, comprising:

a disk having a plurality of generally evenly spaced radially extending teeth formed on a periphery thereof, an aperture formed therein, and an axially extending key slot formed in a wall of said aperture adapted for detachably coupling said disk for rotation with an axle shaft;

a sleeve adapted to be rotatably mounted inside a housing for enclosing an axle shaft, said sleeve having an axially extending key slot formed in an outer surface at an outer end thereof and means formed at an inner end for engaging cooperating driving means formed on a side gear adapted to be coupled to an axle shaft, said key slots adapted to cooperate with a key for preventing relative rotation between said sleeve and said disk;

a generally radially outwardly extending flange formed on said inner end of said sleeve and being adapted to cooperate with a differential case mounted in the housing to restrict axial movement of said sleeve with respect to the housing ; and a guard plate having an aperture for receiving a drive axle shaft and adapted to be attached to the housing for protecting said disk.

13. The apparatus according to claim 12 including a pair of annular grooves formed in an exterior surface of said sleeve and spaced apart a distance corresponding to a thickness of said disk, and a pair of retaining rings for engaging said grooves and preventing relative axial movement between said disk and said sleeve.

14. The apparatus according to claim 12 wherein said means for engaging cooperating driving means formed on a side gear includes a plurality of generally axially extending tabs formed on said inner end of said sleeve and adapted to engage a cooperating plurality of slots formed in a facing surface of the side gear of the differential carrier assembly.

15. The apparatus according to claim 12 wherein said means for engaging cooperating driving means formed on a side gear includes at least a pair of diametrically opposed lugs formed on said inner end of said sleeve and adapted to engage corresponding driving surfaces formed on a facing surface of the side gear of the differential carrier assembly.

* * * * *